Figure 1:
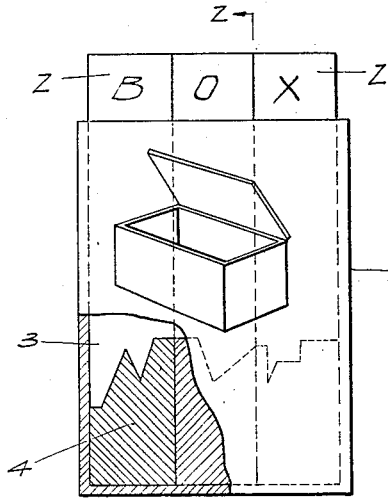

H. A. AIKINS.
EDUCATIONAL APPLIANCE.
APPLICATION FILED FEB. 27, 1911.

1,050,327.

Patented Jan. 14, 1913.

2 SHEETS—SHEET 1.

WITNESSES:

INVENTOR
H. Austin Aikins
BY
J. B. Fay
ATTORNEY

H. A. AIKINS.
EDUCATIONAL APPLIANCE.
APPLICATION FILED FEB. 27, 1911.

1,050,327.

Patented Jan. 14, 1913.
2 SHEETS—SHEET 2.

WITNESSES:

INVENTOR
H. Austin Aikins
BY J. B. Fay
ATTORNEY

UNITED STATES PATENT OFFICE.

HERBERT AUSTIN AIKINS, OF CLEVELAND, OHIO.

EDUCATIONAL APPLIANCE.

1,050,327.	Specification of Letters Patent.	Patented Jan. 14, 1913.

Application filed February 27, 1911. Serial No. 611,171.

*To all whom it may concern:*

Be it known that I, HERBERT AUSTIN AIKINS, a citizen of the United States, and a resident of Cleveland, county of Cuyahoga, and State of Ohio, have invented a new and useful Improvement in Educational Appliances, of which the following is a specification, the principle of the invention being herein explained and the best mode in which I have contemplated applying that principle, so as to distinguish it from other inventions.

The present improvements relate to appliances or devices for the teaching or testing of a pupil's knowledge of arithmetic, reading, spelling, foreign languages, history, geography, literature or any other subject in which questions can be asked in such a way as to demand a definite form of words, or a definite arrangement or sequence of letters, figures, or other symbols by way of answer, all without the presence or aid of a teacher being necessary.

I am aware that devices have been put forth consisting of a series of questions printed on pieces of card-board of various shapes and a series of answers printed upon other pieces of card-board having edges complementary to those of such first pieces whereby the several pieces are adapted to be joined together much as in the popular picture puzzles. The pedagogical value, however, of such devices is not much greater than that of the puzzles in question; in other words, the most they do is to test the patience of the pupil in finding the angles and shapes that properly go together, the attention of the learner being directed away from the relation between the question and answer to the relation between the edges of the cards or to other mechanical or spatial relations, which have only an arbitrary connection with the intrinsic relation between the question and answer.

Now, recent experiment with children and animals show that a vast amount of learning depends upon what is ordinarily known as "trial and error", where the desired act in response to a given stimulation is rewarded by a desirable result, *e. g.* by the attainment of food, and any other act of the sort in question leads to no result at all or to an unpleasant one. But in all such experiments there is great danger that the child or animal will respond, not to the signal, or part of the signal, that seems the one essential thing to the experimenter, but to some concomitant element that the experimenter had ignored altogether. These accessory elements have to be carefully eliminated.

Among the objects sought by the present invention, accordingly, is such elimination of inconsequential concomitant elements, in devices or appliances of the class in hand so as to provide a device or appliance in which the learner is necessarily forced to search out and determine the answer deemed desirable, if the operation of the device is to be successful. In the present device, while I utilize mechanical relations, by which the correctness of a given answer to printed questions or their equivalents can be tested, yet at the same time I conceal such relations from the learner to such an extent that it will be easier for him to learn the required answer than to make the required selection or adjustment by merely observing said mechanical relations.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figures 2, 3:
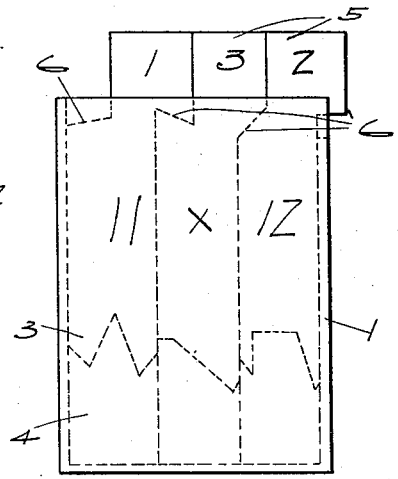
Figure 4:
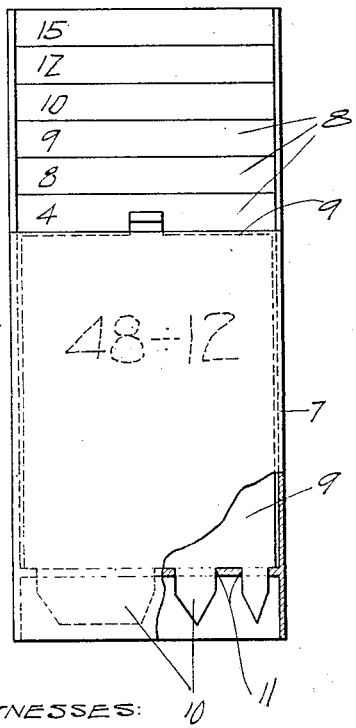
Figure 5:
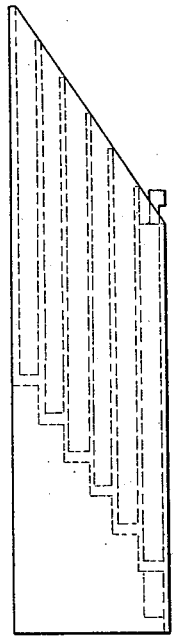
Figure 6:
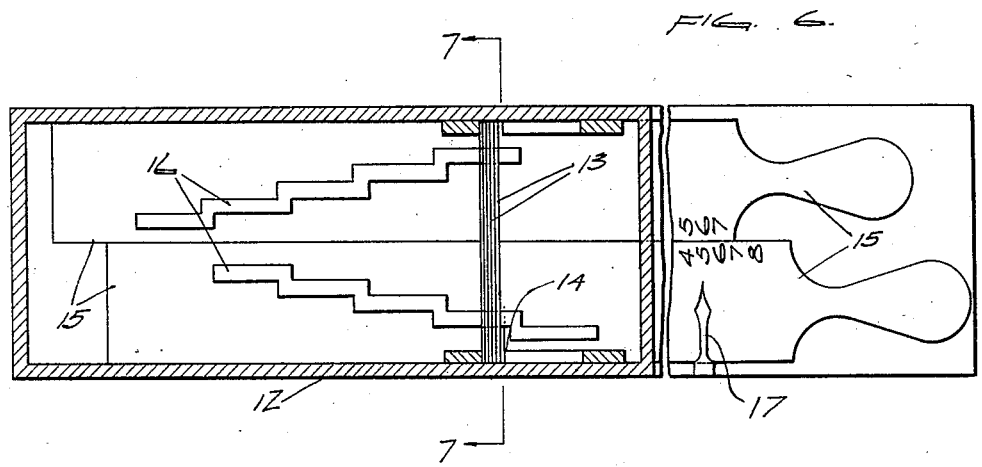
Figures 7, 8:
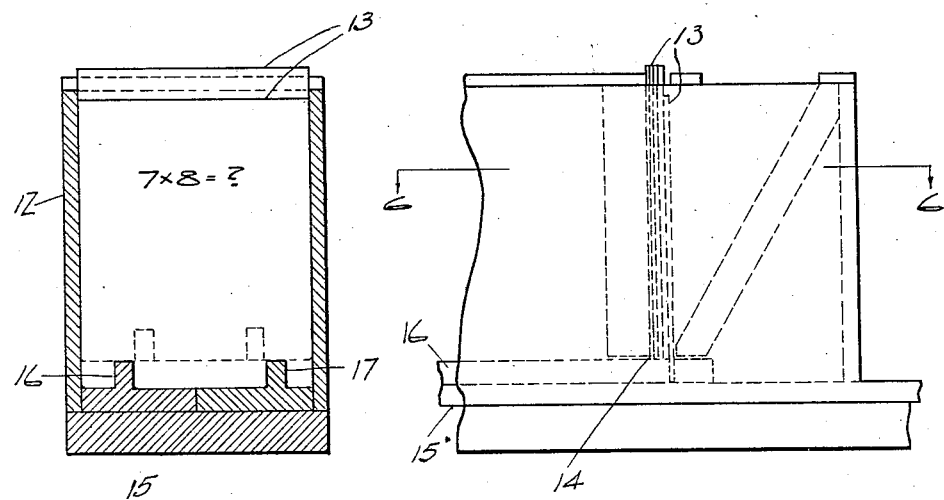

In said annexed drawings:—Figure 1 is a plan view of one form of device embodying my present improvements; Fig. 2 is a transverse sectional view thereof on the line 2—2, Fig. 1; Fig. 3 is a plan view of a modified form of construction; Fig. 4 is a plan, or front elevational, view of yet another constructional form of the invention; Fig. 5 is a side elevation of such last-named form; while Figs. 6, 7 and 8 are respectively a horizontal section, a transverse vertical section, and a transverse longitudinal section of a third modified construction.

The device illustrated in Figs. 1 and 2 is designed for the teaching of spelling. It consists essentially of a flattened case 1 of any suitable dimensions adapted to receive narrow cards or blocks having their inner ends 3 of irregular formation, as illustrated in full and dotted outline in Fig. 1, so as to be adapted to register (when properly selected) with corresponding offsets 4 formed between the walls of the case. On the outside of the case is pictorially presented any object, as for example, a box; the cards, then, which are adapted to register with the notches in the case bearing this particular picture, bear the letters B—O—X so that the word "box" will be spelled when these cards are inserted in the proper order in the case. Any other object may be similarly represented on other cases, and the notches in such cases be arranged to receive the proper letters to spell the names of such objects, respectively.

In place of spelling the name of an object represented on the case, the problem represented may be the sum or product of two numbers similarly portrayed. Such sum or product, when arrived at, may be similarly tested by inserting, in proper order, selected cards 5 bearing individual numbers. Thus in Fig. 3, the problem presented is the determination of the product of "11×12", which being 132, the cards bearing the numerals in question are the only ones formed so as to fit, and in this order, the notches concealed within the case. In the construction illustrated in the figure under consideration, a further modification consists in forming the cards with off-sets 6, or the like, so that they must be inserted in a predetermined order. This will probably be more useful in the spelling lessons than in mathematical problems, since there the order in which the letters are used is material and, unless insisted upon, may lead to a misconception as to the spelling of any particular word.

In Figs. 4 and 5, I illustrate an arrangement for teaching division, consisting of a case 7 provided in this instance with a plurality of pockets 8 that correspond in a sense with the individual cases 1 of the two preceding forms of construction. Here each pocket is appropriately labeled with numerals representing the dividends obtained by dividing various numbers by various other numbers. These latter numbers appear in the form of questions on a series of cards 9, as for example, "48÷12", which cards have their lower edges 10 formed to fit in slots or apertures 11, in the bottoms of the pockets. The lower edge on the particular card just referred to will only fit the notches in the bottom of the pocket bearing the numeral "4", which is the answer to the problem. Where the same numeral represents the answer to several different problems, the several cards bearing such problems will, of course, have their lower ends similarly formed, so as to be capable of fitting the particular pocket in question. Instead of having a series of cases, or pockets, with irregular bottoms, or equivalent registering devices concealed within them, such registering devices being different in the respective structures, a single pocket may be utilized and means provided for varying the nature of the concealed irregularities, and the same result thus obtained. Such a device is the one illustrated in Figs. 6, 7, and 8 where a case 12 is provided in which a plurality of cards 13 are held in a more or less upright position over a slot 14 in such case. Beneath such slot are two transversely movable members 15, which in different relative positions, present raised projections 16 adapted to register with the lower edges of an appropriately formed card. A particular card will hence drop into the slot in the secondary bottom of the box only when the members thus referred to are properly disposed relatively to each other, and to such slot. As a guide to such disposition the forwardly extending portions of such members, in the case selected for illustration, bear numerals that may be brought into juxtaposition with each other and a fixed pointer 17, or equivalent index, to form various numbers. Thus, in Fig. 6, the number "56" is indicated by the means just described. It will be seen that the case and the blocks comprise practically one member separated into complementary parts. The separable part, the block, may be again divided into other portions each of which bears the representation of one figure, letter, or word, as may be desired. Assuming the cards to bear questions in multiplication on their faces, the problem that is presented, is the manipulation of the members so that the card bearing the right answer is free to drop into the slot and, by thus disappearing, apprise the learner of the correctness of his solution. In the case in hand, the problem (see Fig. 7) may be "7×8=?", or any other problem, whether of addition, subtraction, multiplication or division, the answer to which can be composed of the numerals on the exposed portions of members 15. The projections 16 are, of course, entirely hidden, so that these numerals are the only guide-means afforded the pupil.

It is not deemed necessary to illustrate in detail the numerous applications to which any of the foregoing devices are susceptible, whereby they may be adapted for use in teaching a great variety of subjects. Nor is it deemed necessary to illustrate further modifications or means for securing the results obtainable by the present invention. It will be observed, however, that in each of the forms thus illustrated the parts cannot be fitted together by their mere appearance. The only alternative, hence, to learning is a laborious trial of one answer after another, as result of which the pupil soon learns to value the answer when found, and to learn it so as to avoid so much trouble in the future, all the more so if he is competing with others to get the answers all worked out quickly, or if there is some reward for quick work, or some account taken of the number of trials necessary to complete the task assigned. In all the various modified forms of the invention described above, it will be evident that the position of question and answer may be reversed; that is, in Fig. 1 for example, the question may be represented on the card and the answer on the case.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination with a case; of a block adapted to fit in said case, said case and block bearing indicia representative of a question and its answer, when said block and case are fitted together; engaging means concealed within said case and adapted to register with a selected block only.

2. In a device of the character described, the combination with a case; of a plurality of blocks adapted to fit in said case, said case and said blocks bearing indicia representative of a question and its answer, when said blocks and case are properly fitted together; and engaging means concealed within said case and adapted to register with selected blocks only.

3. In a device of the character described, the combination with a case; of a plurality of blocks adapted to fit in said case in a predetermined order, said case and said blocks bearing indicia representative of a question and its answer, when said blocks and case are properly fitted together; and engaging means concealed within said case and adapted to register with selected blocks only.

4. An educational appliance comprising a member made of separate parts, one of such parts being made up of separable portions, said portions and said integral part bearing indicia adapted to represent a question and its answer when such portions and said part are properly assembled, the portions of said part being individually registrable; such integral part being adapted to conceal the manner of such registration.

5. An educational appliance comprising a plurality of cases bearing indicia and representing questions; a plurality of blocks adapted to fit in said cases bearing indicia representing answers to said questions, respectively; and engaging means concealed within said cases and respectively adapted to register with selected blocks only.

6. An educational appliance comprising a plurality of blocks, each of such blocks being provided with individual registering means; a case adapted to receive them; and complementary registering means concealed within said case and adapted to register with said blocks in a predetermined order only; said case and blocks when in registration bearing indicia representative of a question and its answer.

Signed by me this 20th day of February, 1911.

H. AUSTIN AIKINS.

Attested by—
    ANNA L. GILL,
    JNO. F. OBERLIN.